United States Patent [19]

Burnett et al.

[11] 4,203,535
[45] May 20, 1980

[54] METHOD AND APPARATUS FOR LOW-DUST DISCHARGE OF PARTICULATE MATERIAL THROUGH A NOZZLE

[75] Inventors: William C. Burnett, 6229 Malloch Dr., Memphis, Tenn. 38138; John D. Adams, Memphis, Tenn.

[73] Assignee: William C. Burnett, Memphis, Tenn.

[21] Appl. No.: 941,382

[22] Filed: Sep. 12, 1978

[51] Int. Cl.² .............................................. G01F 11/20
[52] U.S. Cl. .................................. 222/411; 222/412; 222/459; 222/564
[58] Field of Search ............... 222/564, 459, 547, 410, 222/411, 412, 58; 414/297, 301

[56] References Cited
FOREIGN PATENT DOCUMENTS 491095 2/1954 Italy ......................................... 222/459

*Primary Examiner*—Allen N. Knowles
*Attorney, Agent, or Firm*—Wood, Herron & Evans

[57] ABSTRACT

A method and apparatus are disclosed for low-dust discharge of particulate material such as grain. The apparatus provides a nozzle having a hollow body with an inlet at the top and an outlet at the bottom. An impeller is mounted inside the body in an outwardly and downwardly flaring region below the inlet. A fluid stream of the particulate material drops through the inlet and impinges on the imppeller which deflects or throws the particles outwardly within the flaring region of the nozzle. The coarser, heavier particles have more outward momentum than the lighter, finer particles and are concentrated toward the wall of the nozzle below the impeller while the lighter, finer particles are concentrated toward the center, so that a rough separation is made and stream density is increased. A compacted downwardly moving mass is accumulated within the nozzle and is discharged through the outlet at controlled rate as a denser, relatively dust-free stream in open air.

18 Claims, 2 Drawing Figures

METHOD AND APPARATUS FOR LOW-DUST DISCHARGE OF PARTICULATE MATERIAL THROUGH A NOZZLE

BACKGROUND OF THE INVENTION

This invention relates to the discharge of particulate material, grain for example, from a nozzle and, more specifically, to a method and apparatus for reducing the "dust" emissions that normally occur when a mass of mixed fines and heavier particles is discharged as a falling stream.

"Dust" arising from lighter or fine particles separating from a particulate product stream falling in open air is a significant problem in a number of industries which must handle particulate materials, such as grain, concrete, sand and various minerals. Such "dust" is usually fine particles of the material itself, rather than dirt. It is objectionable because it results in airborne particulate pollution detrimental to the quality of the atmosphere and to the health of operating personnel in the vicinity of the emissions. Such emissions also result in loss of valuable product and, in some cases, may present a serious danger of explosion.

In the grain handling industry, for example, grain is continually moved into and out of barges, elevators, silos, grain bins, trucks, tank cars and the like which may be located either inside or outside of physical structures. The grain typically is moved through tubes or pipes by auger, gravity, drag conveyors, or belts. Grain dust, which consists of small grain particles, becomes dispersed into the atmosphere when the moving grain stream is discharged from the conveyor. The loss of grain dust into the air is an economic problem because it reduces the amount of grain to be sold. Dust emissions may also be in violation of government regulations controlling the quantity of airborne particulate matter released in the air, and such regulations are becoming increasingly stringent. In addition, grain dust is highly flammable. The dust was often allowed simply to float into the atmosphere, and was lost. Because grain dust is valuable, many grain handling operations now recirculate it in the system. However, such recirculation increases the concentration of the finer and drier particles in the air, thereby increasing the risk of dust explosion. Other systems for controlling grain dust have employed fabric filters to collect and recover the dust. Such filters capture the lighter and potentially most explosive particles. As a result, a smaller amount of dust is required for explosion than if the grain dust were vented to the atmosphere. Another prior dust control method includes the use of a dust separation device which extracts the dust from a moving grain stream by means of a fan, concentrates the dust in a cyclone, conveys it to a holding container and then pumps the dust back into the grain below the surface. Such systems are objectionable because they are expensive and because the reintroduction of the grain dust results in concentrated "pockets" or regions of the dust in the bulk pile. Thus, when the grain is randomly sampled, a sample having a high proportion of dust may be obtained, rather than a more representative sample. This lowers the overall value of the grain. It is also common not to reintroduce the grain dust into the grain at all but rather to treat it in another way, for example, by pelletizing it and selling it as inexpensive cattle feed, or merely by hauling it away to a dump.

SUMMARY OF THE INVENTION

In general, it is an object of this invention to provide an effective, relatively low cost means for controlling the dust emissions normally encountered in the discharge of particulate material from a nozzle.

More specifically, it is an object of the invention to provide a discharge nozzle, mountable to a conveyor, such that dust emissions to the atmosphere from a stream of particulate material continuously discharged from the nozzle into the open air are substantially reduced or eliminated.

Another object of the invention is to provide an apparatus for discharging particulate material that is effective to produce a relatively dense falling product stream in which the lighter, finer particles are concentrated toward the center of the falling stream and the heavier, coarser particles toward the outside of the stream, so that the core of falling lighter particles is "curtained", by a "sheath" or moving conduit of the coarser particles falling around the outside, and thereby is not exposed to the open air.

Another object of the invention is to provide a method of low dust discharge of particulate material which does not necessarily require the use of filters or the separation of the dust from the product stream.

Another object of the invention is to provide a method and apparatus for the low-dust discharge of particulate material which does not result in the presence of pockets of dust in the product after discharge, and which produces a bulk pile of homogeneous quality with fines and coarse particles uniformly distributed throughout it.

These and other objects of the invention are accomplished by providing a unique discharge nozzle for attachment to the end of a particulate product conveying or supply pipe. In a presently preferred form of the invention, the nozzle has a vase shape with an inlet at the top, an upper section that flares downwardly and outwardly below the inlet to a maximum diameter, a lower body of gradually decreasing diameter toward the bottom, an outlet in the bottom, and an impeller mounted just below the inlet of the nozzle and preferably rotatable about its vertical axis. The nozzle has two sections, an upper section wherein the impeller is mounted and a lower section for the accumulation of the particulate material. A gate retards or slows the discharge of the material through the outlet opening. The impeller is generally bell-shaped, preferably with a number of spiral blades or vanes on its upper surface. The surface of the impeller preferably defines, with the upper section of the nozzle, a gradually narrowing annular flow space through which the material stream passes, thereby to reduce the proportion of entrained air in the stream and "compact" or densify the stream. Air disentrained from the product stream is relieved back up into the unpressurized supply pipe or vented off. Rotation of the impeller improves uniformity of flow of material around the impeller.

The curvilinear upper surface of the impeller imparts an outward and centrifugal force to the particles, deflecting or throwing them outwardly from the lower edge of the impeller, into a "throw space" within the nozzle. The heavier, denser particles have greater momentum as they travel outwardly in this throw space than the lighter, finer particles, and this tends to concentrate the heavier particles toward the wall of the nozzle below the impeller with the lighter particles concentrating toward the center. The thus roughly segregated particles drop into and accumulate in the lower section of the nozzle with the concentration of the lighter, finer particles being toward the center and the heavier particles being concentrated toward the perimeter of the mass. The decreasing diameter of the lower section of the nozzle toward the outlet further compacts the mass.

The product mass is released from the nozzle through a restricted or gated outlet. The gate controlling flow through the outlet opens in response to the quantity of material accumulated in the nozzle to maintain a predetermined accumulation. In continuous operation, the gate balances the outlet flow rate to the rate of flow of material into the nozzle while maintaining the accumulation of particulate material in the lower nozzle section. This enables further compaction to take place in the lower section.

The product stream exiting the nozzle is relatively dense and is comprised of a core of lighter, finer particles enveloped by a sheath or ring of heavier particles. As a result, mostly only heavier particles are exposed to open air as the product stream drops from the nozzle. In accumulation of the discharged material as a pile (in a barge, grain bin or the like), the lighter particles redistribute to form a substantially uniform pile.

Other objectives and advantages of the invention will be apparent from the following detailed description, reference being had to the accompanying drawings.

DETAILED DESCRIPTION OF THE INVENTION

Figure 1:
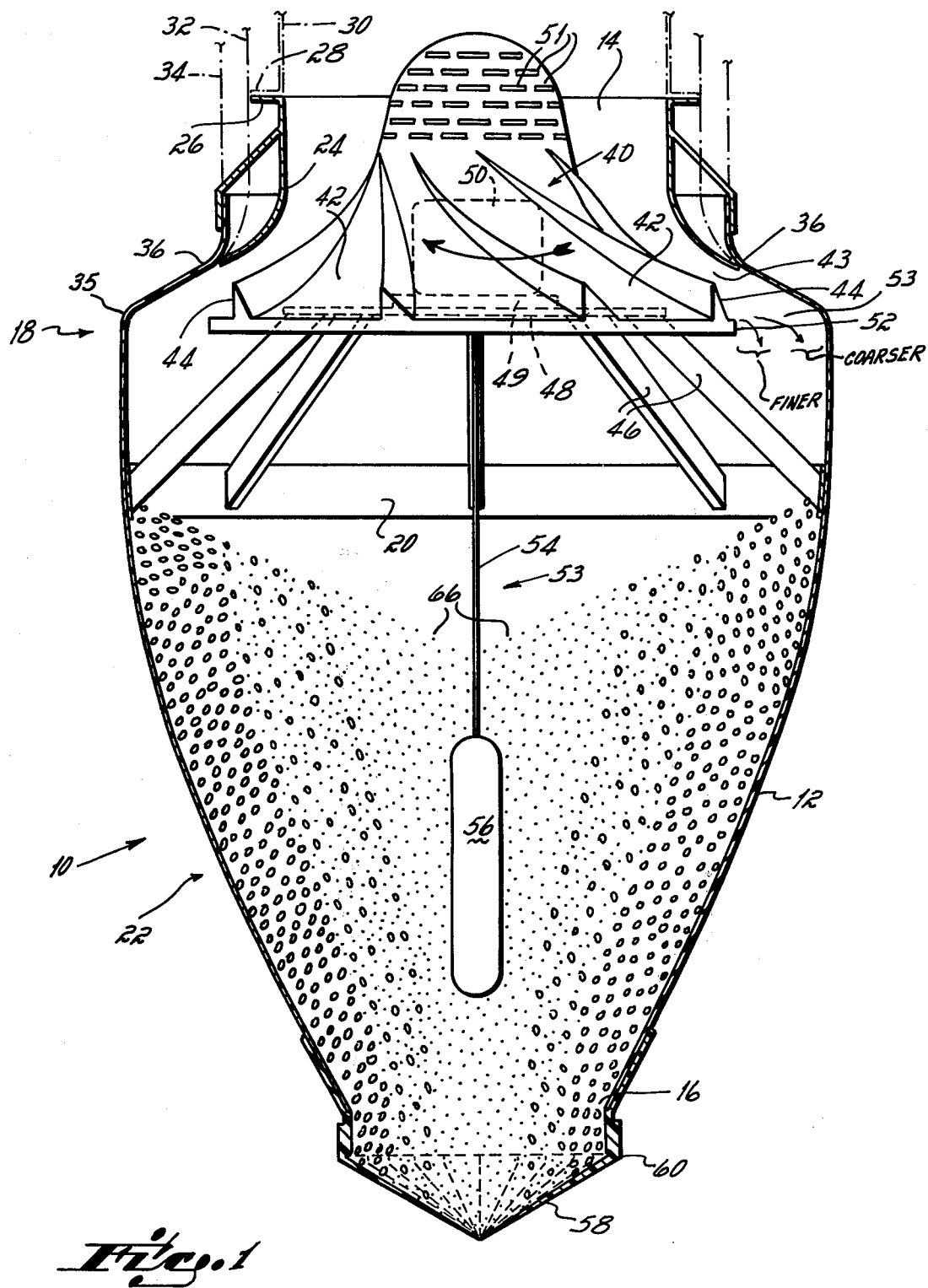
FIG. 1 is a partial axial section showing a nozzle in accordance with a preferred form of the present invention, especially adapted for handling a relatively light material such as grain.
Figure 1:
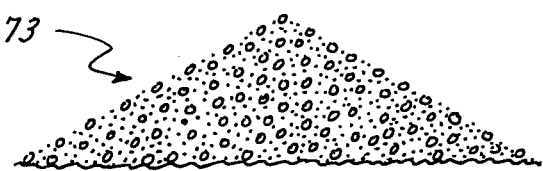

Referring now to FIG. 1, the present invention in preferred form includes a nozzle 10 having an elongated body 12, an inlet opening 14 at the top thereof and an outlet opening 16 at the bottom. The nozzle 10 includes two sections, an upper section 18 located generally above a support ring 20 and a lower body nozzle section 22 therebelow. The inlet opening 14 is adapted to be connected to supply pipes of different diameters. For example, as shown in FIG. 1, an annular adapter 24 having a flange 26 for attachment to a like flange 28 on the end of the supply pipe 30 is employed for accommodating supply pipes of small diameter, for example, 12 inches in diameter. The adapter 24 may be removed and replaced with a like but larger adapter for accommodating larger diameter pipes, e.g., a 14 inch diameter (illustrated by line 32) or a 16 inch diameter (illustrated by line 34). The nozzle 10 may be attached to a supply pipe by bolting the mating flange connection directly, or a flexible tube may be interposed between the supply pipe and the nozzle to permit movement of the nozzle. This is particularly desirable in loading barges and the like to get a uniform loading from front to back and side to side.

In section, the body preferably has a "vase-shape" as shown in FIG. 1, flaring outwardly below adapter 24 to a maximum diameter at 35 in the upper section 18, then gradually decreasing in diameter to the outlet 16 in the bottom section. In the embodiment shown, the body may be molded, for example from fiberglass or polyurethane, or made from sheet metal.

More specifically, the upper section 18 of the nozzle body 12 includes a wall portion 36 (either alone or in combination with the adapter 24) which flares outwardly in the downward direction. An impeller 40 is mounted in the outwardly flaring upper portion of the nozzle body just below inlet 14, and above the point of maximum body diameter 35. The impeller is generally bell-shaped having a parabolic or outwardly flaring surface 42.

Preferably the surface 42 of impeller 40 and outwardly flaring wall 36 together define an annular opening or throat 43 through which the material passes. The throat opening 43 is of gradually decreasing height, i.e., it becomes progressively more constricted below the inlet. This preferred gradual constriction brings the particles closer together as they move past the impeller from the inlet, but without causing undue grinding of the particles which could increase the amount of dust in the product stream. In effect, the density of the particle/air stream is increased as the particles move through the throat area.

The impeller 40 preferably includes a plurality of upstanding curved vanes 44 on its surface 42. It is mounted in the nozzle 10 on a support platform 48 that in turn is carried on supports 46 attached at their lower ends to the support ring 20 secured to the wall of lower body 22. Preferably, the impeller 40 is rotatable on a platform 48 about its vertical axis, annular anti-friction bearing 49 being provided between the impeller and the support platform to facilitate rotation. The impeller can be rotated by the impact of the particles sliding against the spiraling curved impeller vanes 44. Alternatively, the impeller may be motor driven for rotation by either a motor 50 mounted on a support platform interiorly of the impeller 40, or it may be driven from an external motor. The use of a motor drive is particularly applicable where there is a short fall distance of the particles onto the impeller, i.e., where the falling particles do not have sufficient energy themselves to rotate the impeller. Rotation of the impeller in the direction of the arrow serves to more evenly distribute the particles about the periphery and to increase their outward velocity so as to "sling" them through the throat 43. Where the fall distance is sufficiently great, the impact of the falling particles causes rotation of the impeller.

Whether or not the impeller rotates, the slope of its outwardly flaring surface 42 imparts an outward force to the particles falling over it, causing them to be projected outwardly from it. The vanes cause the particles to fall in a spiral path. The coarser, heavier particles have more momentum than the lighter, finer particles, as they travel outward across the annulus or throw space 53 between edge 52 and the inside wall of the nozzle body 12. As a result, the product stream dropping from this space 53 has a greater concentration of fines toward the center or axis and a greater concentration of coarse particles toward the wall of the nozzle. This is illustrated in simplified form in FIG. 1 by the areas marked "coarser" and "finer", showing the relative paths of travel of the particles from the upper section of the nozzle to the lower. As the particles fall into and accumulate in the lower section 22 of the nozzle, the finer particles are pushed toward the center of the nozzle by the outwardly lying coarser particles. The funnel shape of the lower body section contributes to this separation, as product drops through the center outlet.

Means may be provided to vent or release air disentrained from the product stream. This may be done by forming a plurlaity of vents 51 (smaller than the particles) in the impeller dome, or a cone-shaped roof may be mounted over an outlet in the impeller dome. A compactor or vibrator 53 is optionally but preferably provided to further densify the mass below the impeller and release air from between the particles. The compactor may be attached to the support platform and extend downwardly from it. The preferred compactor shown includes a shaft 54 with an eccentric weight 56 at the end. The shaft is rotated with the impeller such that the eccentric weight moves outward and around in a compacting action. The released air is vented upwardly, as through ports 51.

At the outlet 16 is a gate 58 for retarding the flow of the product stream out of the lower section of the nozzle body. The form of gate 58 illustrated in FIG. 1, useful for grain, is made from a resiliently bendable material such as neoprene, and is secured to the wall of the nozzle body 12. The gate 58 may be comprised of a plurality of triangular shaped sections having converging vertices and being bendable at their bases 60. The resiliency of the material biases the gate toward a closed or minimum opening condition. When the weight of the particle mass in the nozzle is great enough to overcome this resiliency, it forces the members outwardly thereby opening the outlet for discharge of material therethrough. Another form of gate is shown in detail in FIG. 2 and includes overlapping leaves 62 which slide one upon another to present a variable diameter funnel. The leaves 62 are spring loaded toward closed position, by strap springs 64, or by a garter spring. When the spring force is overcome by the weight of the mass accumulated in the nozzle, the leaves 62 gradually move outwardly to permit discharge of the material through the outlet. If the inlet feed should slow or stop for any reason, the gate will decrease the outlet opening to maintain the desired accumulation of material in the nozzle 12. Preferably the gate never closes fully, so that the nozzle is self-cleaning after use. While two embodiments of gates are shown by way of example, it should be understood that the invention is not limited to those particular gates, and that other gates may be used in place thereof.

The operation of the discharging method is as follows. A particulate product stream is fed through the inlet opening 14 of the nozzle, either by gravity or by air pressure, in the form of a downwardly moving particle/air stream. The particles come into contact with the curved surface 42 of the impeller 40 and move downwardly and outwardly over it. As the particles travel through the gradually converging throat opening 43 defined by the surface 42 of the impeller and the wall 36 of the upper nozzle section, the particles are moved closer together, thereby reducing the proportion of air. The air is relieved into the supply tube. Preferably the force of the particles impinging on the upper (back) surfaces of the impeller blades 44 is used to rotate the impeller, or the impeller is driven in rotation. This rotation imparts a further centrifugal force to the particles, slinging them outwardly into the space 53. The heavier particles are concentrated primarily toward the outer perimeter of the nozzle body and the finer particles primarily toward the interior. The rotation of the impeller and/or the effect of the spiral blades 44 evenly disperses the falling particles angularly about the axis of the nozzle.

Below the throw space 53 the particles accumulate in the lower nozzle because the gate slows their release. In initial operation, the retainer gate remains sufficiently closed until a predetermined mass (weight) is accumulated and then opens to balance the outlet flow to the inlet flow. By reason of the separation at the impeller stage, the particles accumulate in the nozzle lower body with the finer particles pushed toward the axis by the outer, coarser particles. (This effect is increased by the drawdown of the mass through the relatively small central outlet opening.) The accumulation of the mass of particulate material further displaces remaining entrained air by compaction within its own mass. The compaction increases toward the bottom of the lower body section. Again, the air thus displaced escapes through the vent slots 51 in the dome of the impeller. An inverted cone shape 66 is formed at the top of the mass in the center as particles are released from the outlet below.

The compactor 53 is preferably provided to increase the density of the mass and remove entrained air. As mentioned above, the retainer gate is biased closed either by external means or by its own resiliency, and opens increasingly upon accumulation of material in the nozzle body, the size of the opening permitting an outlet flow rate sufficient to maintain the desired accumulation within the nozzle body.

Figure 2:
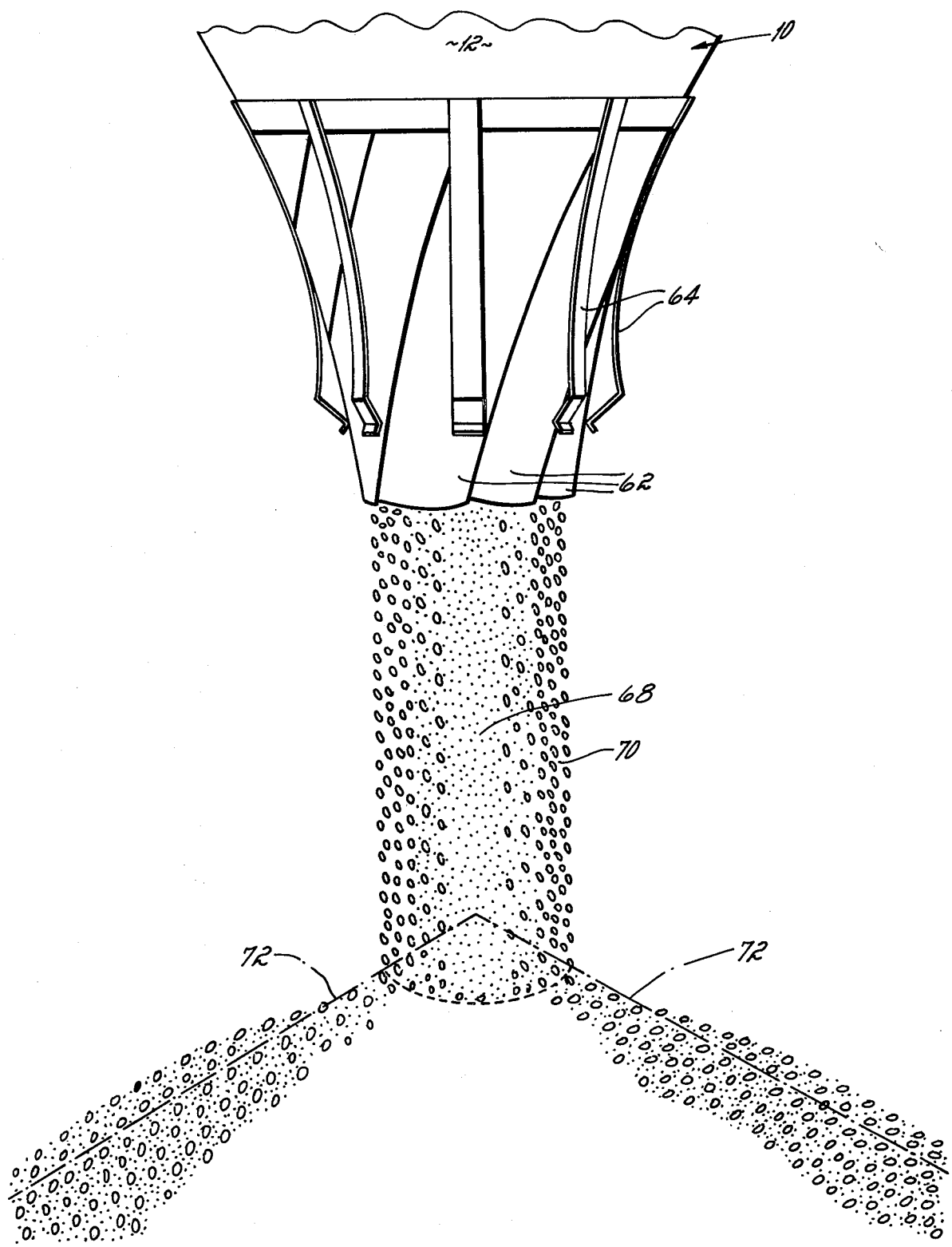
FIG. 2 is an elevation of a nozzle having a different form of gate and showing in a diagrammatic way an axial section of the stream being discharged through the nozzle.

As may be seen in FIG. 2, the stream exiting the nozzle is in the form of a densified mass (in comparison to the feed stream) having a core 68 primarily of lighter particles sheathed by an annular layer 70 primarily of heavier particles. (In the drawings the relative sizes and spacings of the particles are exaggerated.)

As a specific example of apparatus in accordance with the invention, a nozzle for discharging grain (wheat) was built having an overall height of about 42 inches and a maximum diameter (as measured at point 35 in FIG. 1) of 22 inches. An impeller was rotatably mounted in the body, the impeller having a 16 inch diameter, an overall height of 9½ inches, and spiral vanes that extended upwardly for 5 inches (vertical distance) on the curved impeller surface. The throw space between the edge of the impeller and the nozzle wall measured three inches in width. The distance from the bottom of the impeller to the gate below was 32 inches. The gate at the bottom was capable of opening to a maximum extent of 9½ inches, but in use it in fact stabilized at an opening diameter of about 6 to 6½ inches.

This nozzle was mounted to a 12×12 inch square feed chute. Wheat was discharged through it at a rate of about 6,000 bushels per hour. The incoming stream impinged on the impeller from a 12 foot drop down the chute, thereby causing the impeller to rotate. The grain was discharged from the nozzle into a truck, the bed of which was about 10 feet below the nozzle outlet. The discharge of this stream resulted in almost no visible dust, in spite of the fact that the wheat had a relatively high dust content. In contrast, the same material, discharged from the same chute but without the nozzle of the invention, created a serious dust problem.

The particles when accumulated on a surface initially build as a conical shaped pile (illustrated by lines 72 in FIG. 2). On further accumulation, the stream depresses the tip portion of the cone with the material accumulating from the inside toward the outside. Actual observation has indicated that the stream penetrates the pile, causing caving in of the pile at the tip around the periphery of the stream, and building of the pile from the inside out. Further, the particles have been observed to redistribute themselves in the pile into a substantially uniform dispersion of lighter and heavier particles, as indicated at 73 in FIG. 1. As a result of the method of this invention, nonuniformities or pockets of lighter material, which would detract from the value of the product, are eliminated even though the falling stream itself is not uniform, as sampled along a diameter. Rather, a substantially uniform pile is provided.

The method and apparatus of the present invention are also applicable to a pressurized system wherein the incoming flow of particulate material is under air pressure. In this case, it is desirable to provide for positive venting of the pressurized air, for example, through openings in the wall of the nozzle body at the throat area, covered by filters.

We claim:

1. A method of discharging particulate material containing heavier and lighter particles, comprising the steps of:
   feeding said material as a downwardly moving stream through the inlet of a nozzle,
   deflecting said particles outwardly within said nozzle into an annular space, the heavier particles upon such deflection having greater outward momentum than the lighter, finer particles, thereby classifying the stream inside the nozzle with the lighter particles concentrated toward the center and the heavier particles concentrated toward the wall of the nozzle,
   accumulating a quantity of the thus classified mass in said nozzle, and
   releasing said mass from said nozzle at the bottom thereof,
   the released mass falling as a stream in which the heavier particles toward the outside curtain the lighter particles toward the center and thereby reduce escape of said lighter particles as dust.

2. The method of claim 1 wherein said stream is gravity fed into said nozzle.

3. The method of claim 1 wherein said stream is fed into said nozzle under pressure.

4. The method of claim 1 wherein said mass is released at a rate sufficient to maintain a predetermined quantity of said mass of particles in said nozzle.

5. A method of discharging a stream of particulate material through a nozzle comprising the steps of:
   providing a nozzle having an enclosed body portion, an inlet opening at the top thereof and an outlet opening at the bottom thereof,
   feeding said material through said inlet opening in the form of a downwardly falling stream of particles of different sizes,
   directing said particles along a path curving outwardly from the center of the falling stream to impart a force deflecting said particles outwardly into a surrounding space, the coarser particles in said stream having greater outward momentum than the finer particles, to form a downwardly falling mass having the finer particles concentrated toward the center and the coarser particles concentrated toward the perimeter of said mass,
   accumulating and compacting said mass in said body portion, and
   discharging said particles through said outlet opening while retaining a predetermined weight of said material in said body portion, the rate of discharge being sufficient to maintain said predetermined weight therein.

6. The method of claim 5 including the additional step of passing said particles through a confined, narrowing throat space while directing said particles along said curved path, thereby to densify said stream.

7. The method of claim 5 wherein said compaction is assisted by mechanical vibration of the mass.

8. A nozzle for low-dust discharge of a stream of particulate material comprising
   a nozzle body including upper and lower sections, an inlet in the top of said upper section for receiving said stream and an outlet in the bottom of said lower section,
   means located in said upper section for deflecting the particulate material outwardly as said stream moves through the nozzle body,
   said body defining a throw space around said deflecting means into which said stream is deflected and through which the particles fall, thereby forming a downwardly moving mass having the finer particles concentrated toward the center of said nozzle body and the coarser particles concentrated toward the wall of the nozzle body, and
   means associated with said outlet for restricting the flow of said mass through said outlet to accumulate a predetermined quantity of said mass in said lower section.

9. The nozzle of claim 8 wherein said deflecting means comprises an impeller rotatable about a vertical axis.

10. The nozzle of claim 9 wherein said nozzle includes means for rotating said impeller about said vertical axis.

11. The nozzle of claim 9 wherein said impeller includes means for venting air from said lower section.

12. A nozzle for the low-dust discharge of a stream of particulate material comprising
   a hollow nozzle body including an outwardly flaring upper section, a lower section extending therebelow having a gradually decreasing diameter, an inlet to the top of said upper section for receiving infed material and an outlet from the bottom of said lower section,
   impeller means mounted within said upper section and having an outwardly and downwardly flaring upper surface, said impeller means serving to impart an outward direction of movement to infed particles falling thereon and project them outwardly toward the wall of said body to form an outwardly and downwardly moving mass of particles within said body having the finer particles concentrated toward the center of said body and the coarser particles concentrated toward the wall of the body, the surface of said impeller means defining with the wall of said upper section a constricted annular opening around said impeller means, and
   gate means at said outlet for restricting the flow of said material through said outlet to accumulate a predetermined quantity of said mass in said lower section.

13. The nozzle of claim 12 wherein said gate means is responsive to the weight of the mass accumulated in said lower section to vary the size of the outlet.

14. The nozzle of claim 12 wherein said impeller means is mounted for rotation about a vertical axis.

15. The nozzle of claim 12 wherein said impeller means includes a plurality of spirally curving blades thereon.

16. The nozzle of claim 12 further including vibrator means in said lower section for compacting said mass therein.

17. The nozzle of claim 12 including exhaust means for release of air from said material.

18. The nozzle of claim 17 wherein said exhaust means are defined by slots in said impeller means.

* * * * *